United States Patent Office 3,094,407
Patented June 18, 1963

3,094,407
CONTROL OF UNDESIRED VEGETATION WITH ESTERS OF N-METHYL-N-CARBOXYMETHYLDI-THIOCARBAMIC ACID
Ching C. Tung, Kirkwood, Mo., and John J. D'Amico, Charleston, W. Va., assignors to Monsanto Chemical Company, St. Louis, Mo., a corporation of Delaware
No Drawing. Filed May 19, 1961, Ser. No. 111,180
12 Claims. (Cl. 71—2.7)

This invention relates to methods of destroying or controlling vegetation and to herbicidal compositions. More particularly it relates to methods of destroying or controlling vegetation by applying thereto a toxic concentration of certain esters of N-methyl N-carboxymethyldithiocarbamic acid.

A general object of the invention is to destroy undesired vegetation. A particular object of the invention is to provide herbicidal compositions which are effective against broadleaf weeds. A further particular object is to destroy undesired vegetation by application of the toxicant to the foliage and to provide compositions for such purpose. A further object is to provide esters of dithiocarbamic acids having post-emergence activity and high specificity. Other and further objects will be apparent from the following detailed description.

Esters of dithiocarbamic acids have achieved considerable success as pre-emergence grass herbicides but have not been especially effective for post-emergence use. There has now been discovered an effective class of post-emergence dithiocarbamate herbicides having high specificity but to broadleaves, not to grasses. They are essentially harmless to grasses. The herbicides of this invention may be represented by the general formula $$CH_3-N-CH_2COOH$$
$$\phantom{CH_3-N-}|$$
$$\phantom{CH_3-N-}C(S)SR$$

where R represents lower alkyl, lower alkenyl or lower haloalkenyl, as for example methyl, ethyl, propyl, butyl, amyl, allyl, 2-chloroallyl, 2-bromoallyl, 2,3-dibromoallyl, 2,3-dichloroallyl, 2,3,3-trichloroallyl, 2,3,3-tribromoallyl and 3,3-dichloroallyl. R is preferably unbranched and the acid hydrogen may in many instances be replaced by salt-forming groups especially where R is hydrocarbon. For some reason salts of haloalkenyl esters have been much less active than the acids. Examples of suitable salts comprise sodium, potassium and ammonium salts and substituted ammonium or amine salts. Examples of amines which may be used to form substituted ammonium salts are mono-, di- and tri-alkylamines, alicyclic amines, heterocyclic amines and alkylanilines as for example diethylamine, diethanolamine, tert. butylamine, dipropylamine, diisopropylamine, dimethylamine, dibutylamine, dicyclohexylamine, morpholine, N-methylaniline, N-methylcyclohexylamine, trimethylamine, triethylamine, ethanolamine and cyclohexylamine. It will be understood that with the exception noted the free acids and salts may be used interchangeably and are to be regarded as equivalent in the present specification and claims.

A method of destroying or controlling undesired vegetation, according to this invention, comprises applying thereto a toxic concentration of the aforesaid ester of N-methyl N-carboxymethyldithiocarbamic acid. The concentration will vary depending upon the particular vegetation for which control is sought. In general, concentrations within the range of 0.05 to 0.5% by weight of the total composition are adequate for most purposes although higher concentrations are, of course, very effective but seldom necessary. Thorough coverage of the foliage is effective for contact killing. Alternatively, the toxicants may be applied to the soil medium so as to contact growing seeds or seedlings. Although the toxicants in the form of free acids are insoluble in water, they are soluble in common organic solvents. They may be dispersed directly in water or a solution in organic solvent may be dispersed in aqueous medium with or without the aid of a surface active agent. Emulsions may be prepared from solution in water immiscible solvents. As dispersing and wetting agents there may be employed soft or hard sodium or potassium soaps, alkylated aromatic sodium sulfonates such as sodium dodecylbenzene sulfonate, or an amine salt thereof, alkali metal salts of sulfated fatty alcohols, ethylene oxide condensation products of alkyl phenols, tall oil, higher alcohols or higher mercaptans. The alkali metal and ammonium salts are quite water soluble and are soluble in acetone and ethanol but insoluble in ether, chloroform and hydrocarbon solvents. Amine salts generally have appreciable water solubility as well as solubility in common organic solvents.

Table I illustrates the herbicidal activity of typical compounds of this invention. The toxicant was emulsified in water and this emulsion applied as a spray. The sprays were applied to the foliage of grass and to the foliage of broadleaved plants, the latter being either bean plants or a mixture of broadleaved plants, and the effect recorded. A rating of 0 indicates no phytotoxicity, 1 slight phytotoxicity, 2 moderate phytotoxicity and 3 severe phytotoxicity.

Table 1

| Active Ingredient | Conc., percent | Phytotoxicity Rating | | |
|---|---|---|---|---|
| | | Grass | Bean | Broadleaf |
| 2 - Chloroallyl N - (carboxymethyl) - methyldithiocarbamate | 0.5 | 1 | 1 | 2+ |
| 3,3-Dichloroallyl N-(carboxy- methyl)- methyldithiocarbamate | 0.5 | 2 | 2 | 3+ |
| | 0.2 | 1 | 1 | 2+ |
| 2 - Bromoallyl N - (carboxymethyl) - methyldithiocarbamate | 0.5 | 1+ | 1 | 3 |
| cis- and trans-2,3-Dichloroallyl N-(carboxymethyl)methyl-dithiocarbamate | 0.5 | 1+ | 2 | 2+ |
| Ethyl N - (carboxymethyl) methyl - dithiocarbamate | 0.5 | 0 | 2 | 3 |
| Sodium salt of methyl N-(carboxymethyl)methyldithiocarbamate | 0.5 | 1+ | 3+ | 3+ |
| | 0.2 | 1 | 3 | 3 |
| | 0.01 | 1 | 2 | 2 |
| Propyl N - (carboxymethyl) methyl - dithiocarbamate | 0.5 | 1+ | 2 | 2+ |
| Methyl N - (carboxymethyl) methyl - dithiocarbamate | 0.5 | 0 | 3+ | 3+ |
| | 0.1 | 0 | 1+ | 3 |
| | 0.05 | 0 | 1+ | 3 |
| Butyl N - (carboxymethyl) methyl - dithiocarbamate | 0.5 | 1 | 1 | 3 |
| Diethylamine salt of methyl N-(carboxymethyl)methyldithiocarbamate | 0.5 | 1 | 3 | 3 |
| tert. Butylamine salt of methyl N-(carboxymethyl) methyldithiocarbamate | 0.5 | 0 | 3 | 3 |
| | 0.2 | 0 | 2 | 3 |
| Cyclohexylamine salt of methyl N-(carboxymethyl) methyldithiocarbamate | 0.5 | 0 | 2 | 2 |
| Diisopropylamine salt of methyl N-(carboxymethyl) methyldithiocarbamate | 0.5 | 0 | 3 | 3 |
| | 0.2 | 0 | 2 | 1 |

It is intended to cover all changes and modifications of the examples of the invention herein chosen for purposes of disclosure which do not constitute departures from the spirit and scope of the invention.

What is claimed is:
1. The method of destroying undesired vegetation which comprises applying to foliage thereof a toxic concentration of a compound of the structure

$$CH_3-N-CH_2COOH$$
$$\phantom{CH_3-N-}|$$
$$\phantom{CH_3-N-}C(S)SR$$

where R is selected from the group consisting of lower alkyl, lower alkenyl and lower haloalkenyl, the halogen being selected from a group consisting of chlorine and bromine.

2. The method of destroying undesired vegetation which comprises appying to foliage thereof a toxic concentration of a compound of the structure

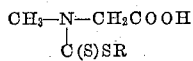

where R is lower n-alkyl.

3. The method of destroying undesired vegetation which comprises applying to foliage thereof a toxic concentration of a compound of the structure

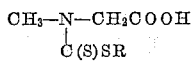

where R is lower alkenyl.

4. The method of destroying undesired vegetation which comprises applying to foliage thereof a toxic concentration of a compound of the structure

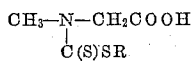

where R is lower chloroalkenyl.

5. The method of destroying undesired vegetation which comprises applying to foliage thereof a toxic concentration of 3,3-dichloroallyl N-(carboxymethyl)methyldithiocarbamate.

6. The method of destroying undesired vegetation which comprises applying to foliage thereof a toxic concentration of methyl N-(carboxymethyl)methyldithiocarbamate.

7. The method of destroying undesired vegetation which comprises applying to foliage thereof a toxic concentration of tert. butylamine salt of methyl N-(carboxymethyl)methyldithiocarbamate.

8. The method of destroying undesired vegetation which comprises applying to foliage thereof a toxic concentration of sodium salt of methyl N-(carboxymethyl)methyldithiocarbamate.

9. A herbicidal composition comprising a major proportion of a carrier and a minor proportion, sufficient to destroy undesired vegetation upon application to foliage, of a compound of the structure

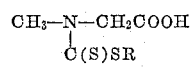

where R is selected from the group consisting of lower alkyl, lower alkenyl and lower haloalkenyl the halogen being selected from a group consisting of chorine and bromine and a small amount of a surface active agent.

10. A herbicidal composition comprising a major proportion of a carrier and a minor proportion, sufficient to destroy undesired vegetation upon application to foliage, of a compound of the structure

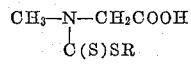

where R is lower n-alkyl.

11. A herbicidal composition comprising a major proportion of a carrier and a minor proportion, sufficient to destroy undesired vegetation upon application to foliage, of methyl N-(carboxymethyl)methyldithiocarbamate and a small amount of a surface active agent.

12. The method of destroying undesired vegetation which comprises applying to the soil medium so as to contact growing seeds and seedlings a toxic concentration of a toxic compound of the structure

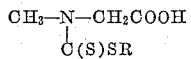

where R is selected from the group consisting of lower alkyl, lower alkenyl and lower haloalkenyl the halogen being selected from a group consisting of chlorine and bromine.

References Cited in the file of this patent

FOREIGN PATENTS 858,352    Germany _____ Dec. 4, 1952

OTHER REFERENCES

Van der Kerk et al., in "Nature," vol. 176, No. 4476, pages 308 to 310, Aug. 13, 1955.

Fawcett et al., in "Nature," vol. 178, No. 4540, pages 972 to 974, Nov. 3, 1956.